US010173706B2

(12) United States Patent
Bacallao et al.

(10) Patent No.: US 10,173,706 B2
(45) Date of Patent: Jan. 8, 2019

(54) RETAIL STORE CART

(71) Applicant: Walmart Apollo, LLC, Bentonville, AR (US)

(72) Inventors: Yurgis Mauro Bacallao, Centerton, AR (US); Stephen Tyler Caution, Bentonville, AR (US); Kenneth Samuel Larsen, Centerton, AR (US)

(73) Assignee: WALMART APOLLO, LLC, Bentonville, AR (US)

(*) Notice: Subject to any disclaimer, the term of this patent is extended or adjusted under 35 U.S.C. 154(b) by 0 days.

(21) Appl. No.: 15/703,208

(22) Filed: Sep. 13, 2017

(65) Prior Publication Data

US 2018/0086358 A1    Mar. 29, 2018

Related U.S. Application Data

(60) Provisional application No. 62/401,429, filed on Sep. 29, 2016.

(51) Int. Cl.
*B62B 3/00* (2006.01)
*B62B 3/10* (2006.01)
*B62B 3/02* (2006.01)

(52) U.S. Cl.
CPC .............. *B62B 3/106* (2013.01); *B62B 3/02* (2013.01); *B62B 2203/073* (2013.01); *B62B 2203/20* (2013.01); *B62B 2301/04* (2013.01)

(58) Field of Classification Search
CPC .. B60B 3/106; B60B 3/02; B60B 3/10; B60B 3/00; B60B 3/002; B60B 2203/20; B60B 2203/073; B60B 2203/00; B60B 2203/21; B60B 2203/22; B60B 2203/24; B60B 2203/07
See application file for complete search history.

(56) References Cited

U.S. PATENT DOCUMENTS 1,562,089 A * 11/1925 Holley .................... B62B 3/005
                                                              108/101
2,555,178 A *  5/1951 Young ..................... A47L 13/50
                                                                 211/1

(Continued)

OTHER PUBLICATIONS

"Luxor AVJ42KB Steel Adjustable A/V Cart with Pull-Out Keyboard Tray (Black)," BHPhotoVideo.com, accessed Jul. 29, 2016.

(Continued)

*Primary Examiner* — James M Dolak
(74) *Attorney, Agent, or Firm* — Schmeiser, Olsen & Watts LLP

(57) ABSTRACT

Described is a mobile point-of sale cart for use in a retail store. The cart has four legs and three platforms coupled to the legs. Each of the three platforms is at a different height above the ground. The legs have wheels for easy movement from one place to another, and the legs are telescoping so the cart can be easily stored. The cart holds the equipment needed for a retail store employee to checkout customers and perform other common tasks. The cart has multiple bins to hold a handheld scanner, a debit card reader, and a portable printer. The cart has a bagging station coupled to the top platform, and a shopping bag support surface coupled to the second platform. The cart can be moved about the store to easily ring up purchases, and can be stored when not in use.

17 Claims, 5 Drawing Sheets

(56) References Cited

U.S. PATENT DOCUMENTS

| | | | | |
|---|---|---|---|---|
| 3,999,775 | A * | 12/1976 | Brongo | B62B 3/003 211/187 |
| 4,998,694 | A * | 3/1991 | Barteaux | B65B 67/1216 248/100 |
| 5,190,253 | A * | 3/1993 | Sable | B65B 67/1205 248/97 |
| 5,412,193 | A * | 5/1995 | Swartz | G06K 7/10564 186/61 |
| 5,492,199 | A * | 2/1996 | Shimoyama | A47F 9/046 186/61 |
| 6,619,546 | B1 * | 9/2003 | Nguyen | A47F 9/047 235/383 |
| 6,860,494 | B1 * | 3/2005 | Chisholm | B62B 3/02 280/47.19 |
| 6,880,851 | B1 | 4/2005 | Summers et al. | |
| 7,014,199 | B2 * | 3/2006 | Hendzel | B62B 3/106 248/131 |
| 7,213,816 | B2 * | 5/2007 | Gregory | B62B 3/106 280/33.996 |
| 7,320,472 | B2 * | 1/2008 | Gregory | B62B 3/106 280/33.996 |
| 7,490,559 | B2 * | 2/2009 | Bentschneider | A47B 9/00 108/50.01 |
| 7,988,160 | B2 * | 8/2011 | Lindner | B62B 3/008 280/47.34 |
| 8,528,918 | B2 * | 9/2013 | Macias | B62B 3/02 280/47.35 |
| 8,540,255 | B2 * | 9/2013 | Young | B62B 3/10 280/47.34 |
| 8,590,524 | B2 * | 11/2013 | Ducate, Jr. | A47J 37/0786 126/25 R |
| 8,924,258 | B2 * | 12/2014 | Knoll | G07G 1/0018 235/379 |
| 10,083,593 | B2 * | 9/2018 | Henniges | G08B 21/182 |
| 2003/0155731 | A1 | 8/2003 | Ditges et al. | |
| 2004/0217564 | A1 * | 11/2004 | Ditges | B62B 3/006 280/79.3 |
| 2006/0006621 | A1 * | 1/2006 | Santa Cruz | B25H 3/00 280/79.3 |

OTHER PUBLICATIONS

"Balt 89842 Height Adjustable Laptop Cart," ErgoDirect.com, accessed Jul. 29, 2016.
"Adjustable Utility Cart," RehabMart.com, accessed Jul. 29, 2016.
"H. Wilson W42A Adjustable Steel AV Cart with 3 Shelves (Gray)," BHPhotoVideo.com, accessed Jul. 29, 2016.
"Luxor Furniture AVJ42B Adjustable Height Wheel Cart," EncoreDataProducts.com, accessed Jul. 29, 2016.
"KONGcart2000: Height Adjustable Laptop Cart," GoApeDigital.com, accessed Jul. 29, 2016.

* cited by examiner

RETAIL STORE CART

CROSS REFERENCE TO RELATED APPLICATION

This invention claims priority to U.S. provisional patent application Ser. No. 62/401,429, filed Sep. 29, 2016 to Applicant Wal-Mart Stores Inc., and entitled "Retail Store Cart", which is incorporated entirely herein by reference.

BACKGROUND OF THE INVENTION

Technical Field

This invention relates to retail store fixtures, and specifically to a mobile point-of sale cart used to ring up sales in locations away from a fixed checkout register.

State of the Art

Retail stores have fixed-location checkout stations where customers go to pay for and bag their purchases. The checkout stations have the equipment needed to ring up purchased items, compute the total owed, collect payment from the customer, and bag the items purchased. It is desirable to have a mobile point-of-sale cart that has all the checkout capabilities of a fixed checkout station, and that can be moved about in the retail store. An employee can use the mobile point-of-sale cart in departments that are particularly busy, or as an overflow to the usual checkout stations, or wherever customers would find it convenient to obtain checkout services.

Accordingly, what is needed is a mobile point-of-sale cart that is convenient and easy to move about a retail store, and that holds the equipment needed to ring up customer sales.

DETAILED DESCRIPTION OF EMBODIMENTS OF THE INVENTION

As discussed above, embodiments of the present invention relate to retail store fixtures, and specifically to a mobile point-of sale wheeled cart for checking out customers away from a fixed checkout station.

It is desirable to have a mobile cart that can be used as a mobile checkout station to check out customers away from the traditional fixed-location checkout stations. Traditionally, retail stores have fixed-location checkout stations where customers go to pay for and bag their purchases. The checkout stations have the equipment needed to ring up purchased items, compute the total owed, collect payment from the customer, and bag the items purchased. A mobile checkout station provides a retail store flexibility in handling busy departments and in handling times of heavy use of traditional checkout registers. A mobile point-of sale cart needs to have all the equipment required to ring up and bag purchases, and the cart needs to be easy to move to different locations in the retail store. Disclosed is a wheeled cart with three platforms at different heights above the ground. Each platform is coupled to each of four cart legs. The legs have wheels for easy movement from one place to another, and the legs are telescoping so the cart can be easily stored. The cart holds the equipment needed for a retail store employee to check out customers and perform other common tasks. The cart has a means to dispense shopping bags, a means to hold a handheld scanner, a means to hold a debit card reader, and a means to hold a portable printer. The cart has a bagging station coupled to the top platform, and a shopping bag support surface coupled to the second platform. The cart can be moved about the store to easily ring up purchases, and can be stored when not in use.

Figure 1:
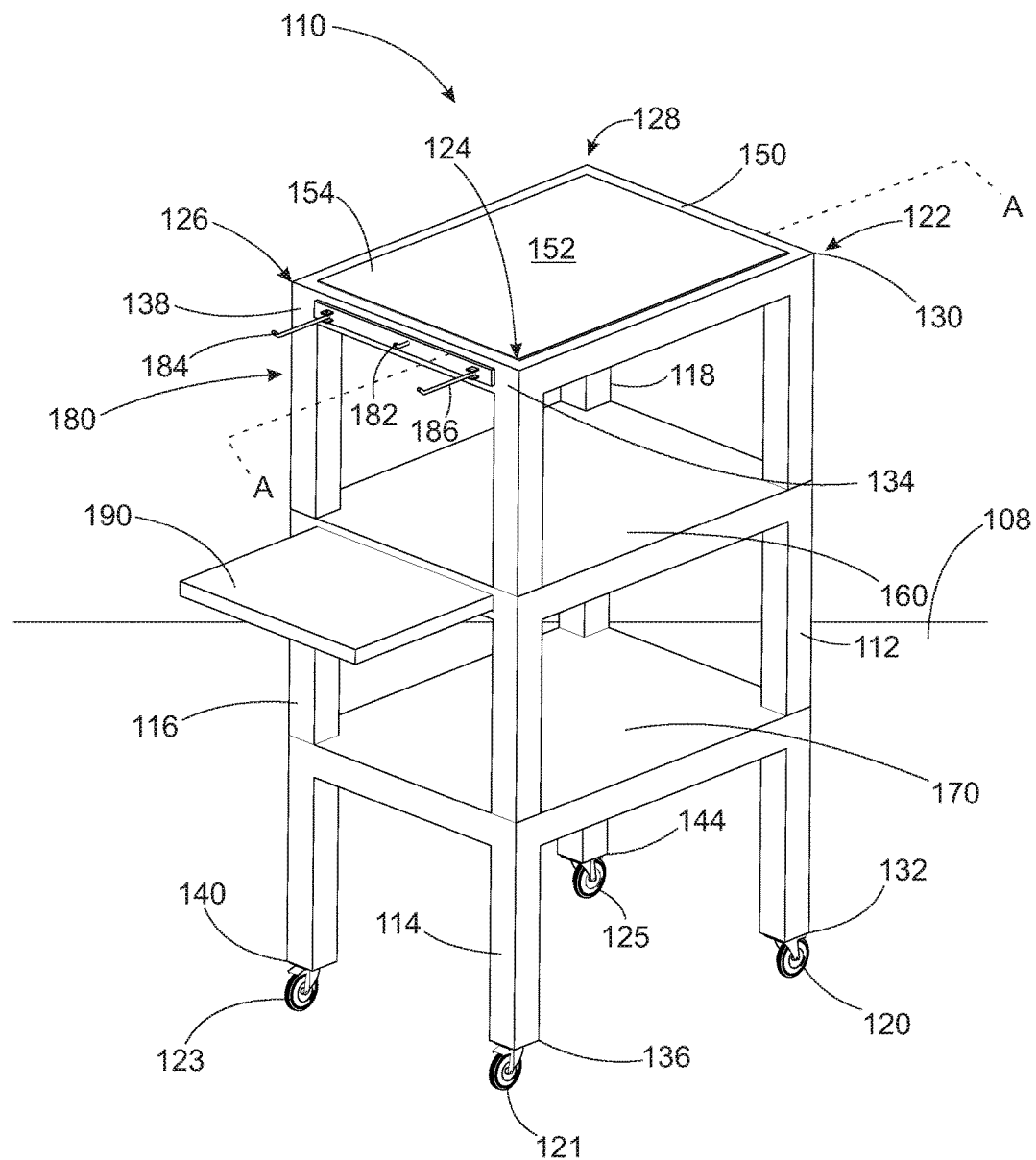
FIG. 1 shows a front perspective view of an embodiment of a cart.
Figure 2:
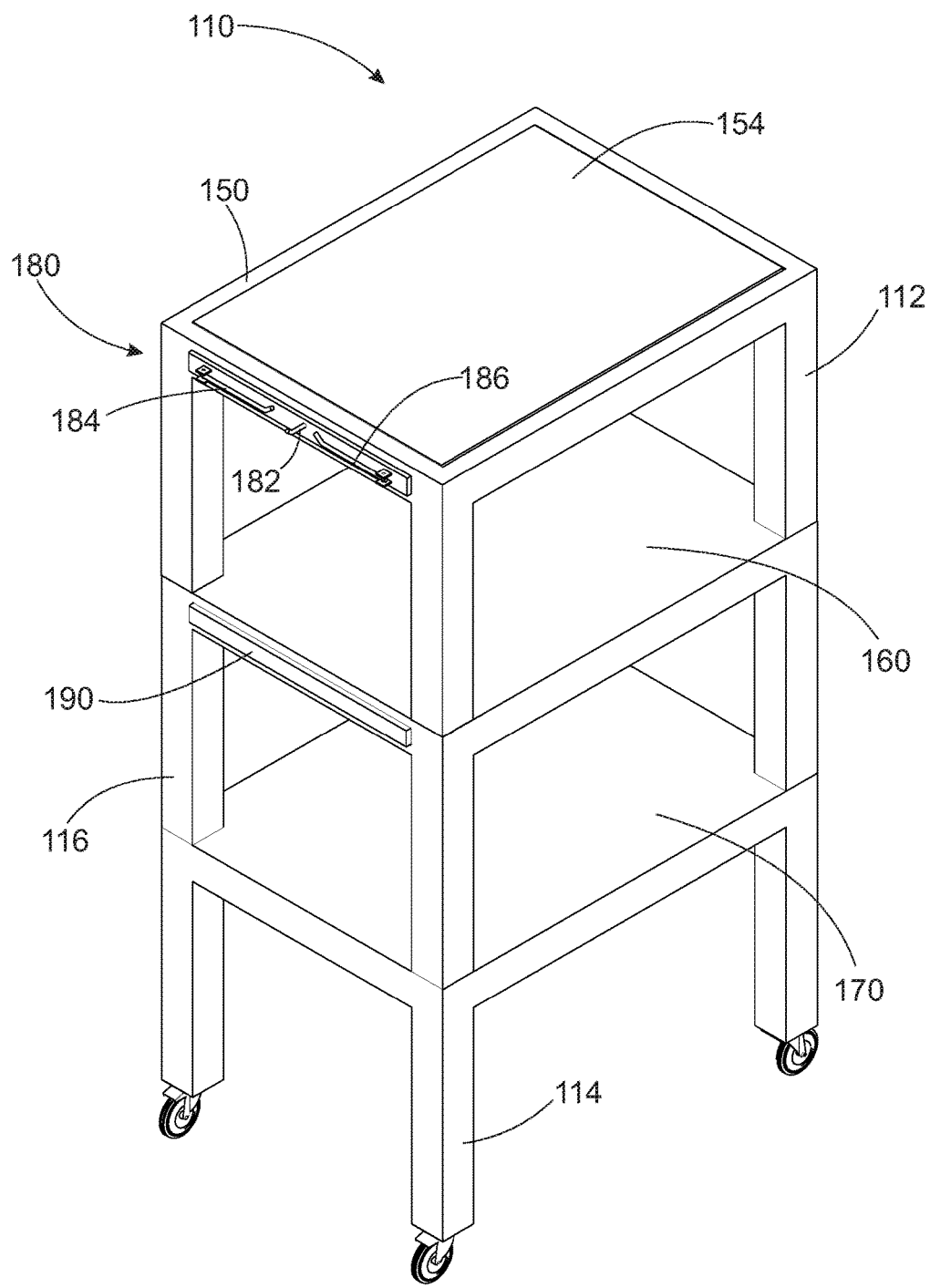
FIG. 2 shows the cart of FIG. 1 with two handle holder arms folded in and a shopping bag support surface retracted.
Figure 3:
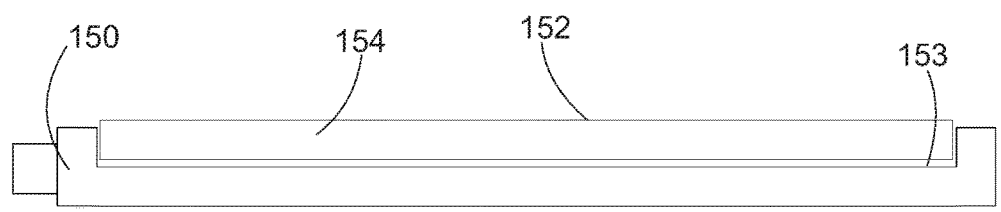
FIG. 3 shows a cross section of an embodiment of a top platform of the cart of FIG. 1.

FIG. 1 through FIG. 3 show an embodiment of a wheeled cart 110. FIG. 1 shows a front perspective view of cart 110 with a bagging station 180 and a shopping bag support surface 190. FIG. 2 shows cart 110 with shopping bag support surface 190 retracted and a first and a second handle holder arm 184 and 186 folded up. FIG. 3 shows a side view cross-section of a first platform 150 of cart 110. Cart 110 is configured to carry tools and equipment needed by employees of a retail store for checking out customers or performing other work-related tasks.

Cart 110 has four legs 112, 114, 116, and 118. Leg 112 is at a corner 122 of cart 110. Leg 114 is at a corner 124 of cart 110. Leg 116 is at a corner 126 of cart 110, and leg 118 is at a corner 128 of cart 110. Legs 112, 114, 116, and 118 are approximately perpendicular to a ground surface 108. Each one of legs 112, 114, 116, and 118 support each of a first platform 150, a second platform 160, and a third platform 170. Each one of first platform 150, second platform 160, and third platform 170 are oriented approximately parallel to ground surface 108.

Leg 112 has a first leg proximal end 130 coupled to first platform 150. Leg 112 has a first leg distal end 132 opposing first leg proximal end 130, with a wheel 120 coupled to first leg distal end 132, in this embodiment. Leg 114 has a second leg proximal end 134 coupled to first platform 150, and a second leg distal end 136 opposing second leg proximal end 134. Leg 114 has a wheel 121 coupled to second leg distal end 136, in this embodiment. Leg 116 has a third leg proximal end 138 coupled to first platform 150, and a third leg distal end 140 opposing third leg proximal end 138. Leg 116 has a wheel 123 coupled to third leg distal end 140, in this embodiment. Leg 118 has a fourth leg proximal end 142 (see FIG. 5) coupled to first platform 150, and a fourth leg distal end 144 opposing fourth leg proximal end 142. Leg 118 has a wheel 125 coupled to fourth leg distal end 144, in this embodiment. In this embodiment, wheels 120, 121, 123, and 125 roll along ground surface 108, making cart 110 easy to move around in a retail store. In some embodiments, legs 112, 114, 116, and 118 do not have wheels.

Legs 112, 114, 116, and 118 are telescoping in this embodiment, providing a means for cart 110 to be made shorter for storage, for example.

Each one of first platform 150, second platform 160, and third platform 170 are supported by each of legs 112, 114, 116, and 118, and are at different heights above ground surface 108, as shown in FIG. 1. Each one of first platform 150, second platform 160, and third platform 170 are used to support items used by an employee that is using cart 110 to check out customers or perform other tasks. Cart 110 can be moved to where the task is to be performed. First platform 150 is the top platform, and is furthest away from ground 108. Second platform 160 is the middle platform, and third platform 170 is the bottom platform, in this embodiment.

Cart 110 includes a bagging station 180 and a shopping bag support surface 190 that are used to bag purchased items. Bagging station 180 is coupled to and extends from first platform 150. Shopping bag support surface 190 is retractably coupled to second platform 160. Shopping bag support surface retracts into, and extends from, second platform 190.

Bagging station 180 is used for bagging purchased items. Bagging station 180 is coupled to first platform 150 in this embodiment, but this is not mean to be limiting. Bagging station 180 includes a bag holder hook 182, a first handler holder arm 184, and a second handle holder arm 186. Each of bag holder hook 182, and first and second handle holder arms 184 and 186 extend from a side of first platform 150 and are approximately parallel to a top surface 152 of first platform 150. First bag holder hook 184 extends from first platform 150 near third leg proximal end 138, in a direction perpendicular to third leg 116. Second bag holder hook 186 extends from first platform 150 near second leg proximal end 134 in a direction perpendicular to second leg 114. Bag holder hook 182 extends from first platform 150 between first bag holder hook 184 and second bag holder hook 186.

Bag holder hook 182 is a hook or a knob coupled to first platform 150 that is used to hold a stack of plastic shopping bags. In some embodiments, bag holder hook 182 is an integral part of first platform 150. In some embodiments, bag holder hook 182 is retractable into, or foldable against, first platform 150. The center hole of the stack of plastic shopping bags is hung from bag holder hook 182 to hold the stack of plastic shopping bags ready to fill.

Bagging station 180 also includes first and second handle holder arms 184 and 186 coupled to first platform 150, as shown in FIG. 1 and FIG. 2. First and second handle holder arms 184 and 186 each hold a handle of one or more shopping bags so the shopping bags can be filled. A shopping bag hung from bag holder hook 182 is pulled open, and its handles are hung from first and second handle holder arms 184 and 186 to hold the bag open. Purchased items are placed in the bag that is open and hung from bagging stations 180. Once the bag is full, the full bag is removed from bagging station 180 and carried out of the store by the customer. If more items need to be bagged, the next bag is opened and filled.

First and second handle holder arms 184 and 186 are foldably coupled to first platform 150, in this embodiment, see FIG. 1 and FIG. 2. First and second handle holder arms 184 and 186 each fold up when not needed, as shown in FIG. 2. In some embodiments, first and second handle holder arms 184 and 186 are an integral part of first platform 150. In some embodiments, first and second handle holder arms 184 and 186 retract into first platform 150.

FIG. 1 shows bagging station 180 with pair of handle holder arms 184 and 186 extended, and shopping bag support surface 190 extended. FIG. 2 shows cart 110 of FIG. 1, with first and second handle holder arms 184 and 186 folded in for storage, and shopping bag support surface 190 retracted into second platform 160 for storage.

Shopping bag support surface 190 is retractably coupled to second platform 160, as shown in FIG. 1 and FIG. 2. Shopping bag support surface 190 is a retractable surface or platform that extends out from second platform 160 in order to support a shopping bag that is being filled. Shopping bag support surface 190 is positioned below bagging station 180 so that when shopping bag support surface 190 is extended, it supports bags and the items in them hanging from bagging station 180. A shopping bag hung from bagging station 180 will set on shopping bag support surface 190 as it is being filled. FIG. 1 shows shopping bag support surface 190 extended from second platform 160. Having shopping bag support surface 190 available to support bags as they are being filled at bagging station 180 helps to prevent the shopping bag from stretching or breaking.

FIG. 2 shows shopping bag support surface 190 retracted into second platform 160. When shopping bag support surface 190 is not being used, it can be retracted into second platform 160. Shopping bag support surface 190 can be retracted into second platform 160 for storage, for example, or at other times when shopping bag support surface 190 is not being used.

First platform 150 is designed to hold equipment used to check out customers or perform other tasks while using cart 110. FIG. 3 shows a simplified cross-section of first platform 150 through section A-A of FIG. 1. In this embodiment, first platform 150 includes a recessed area 153. Recessed area 153 receives a rubber pad 154 in this embodiment. Rubber pad 154 and recessed area 153 keeps equipment such as printers and card scanners from sliding around while cart 110 is being used.

Figure 4:
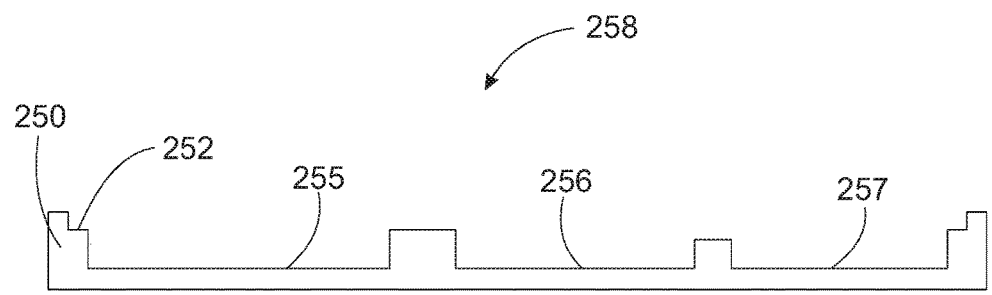
FIG. 4 shows a cross section of a further embodiment of a top platform of a cart.

FIG. 4 shows a cross-section of an embodiment of a platform 250 that can be used in place of first platform 150 on cart 110. Platform 250 includes a set of three bins, a first bin 255, a second bin 256, and a third bin 257, as shown in cross-section in FIG. 4. Platform 250 has a top surface 252 that is shaped with first, second, and third bins 255, 256, and 257. Each of first bin 255, second bin 256, and third bin 257 are shaped depressions formed in top surface 252. Each of first bin 255, second bin 256, and third bin 257 are formed as depressions in top surface 252 so that equipment placed in bins 255, 256, and 257 is secure and convenient. First bin 255 is sized and shaped to receive and hold a handheld scanner. Second bin 256 is sized and shaped to receive and hold a debit card reader. Third bin 257 is sized and shaped to receive and hold a portable printer. First bin 255 holds a handheld scanner so that the handheld scanner can be easily used by an employee using cart 110. With a handheld scanner in first bin 255, the handheld scanner does not fall off of cart 110 when cart 110 is moving around, and the handheld scanner is easily located for use. Similarly, second bin 256 holds the debit card reader and third bin 257 holds the portable printer. In some embodiments, first platform 150 or platform 250 includes other bins for other pieces of equipment. With platform 250 used on cart 110 shown in FIG. 1, an employee using cart 110 can easily find and use the equipment stored in first bin 255, second bin 256, and third bin 257. When platform 250 is used on cart 110, platform 250 of cart 110 has a first bin 255 for holding a handheld scanner, a second bin 256 for holding a debit card reader, and a third bin 256 for holding a portable printer.

Figure 5:
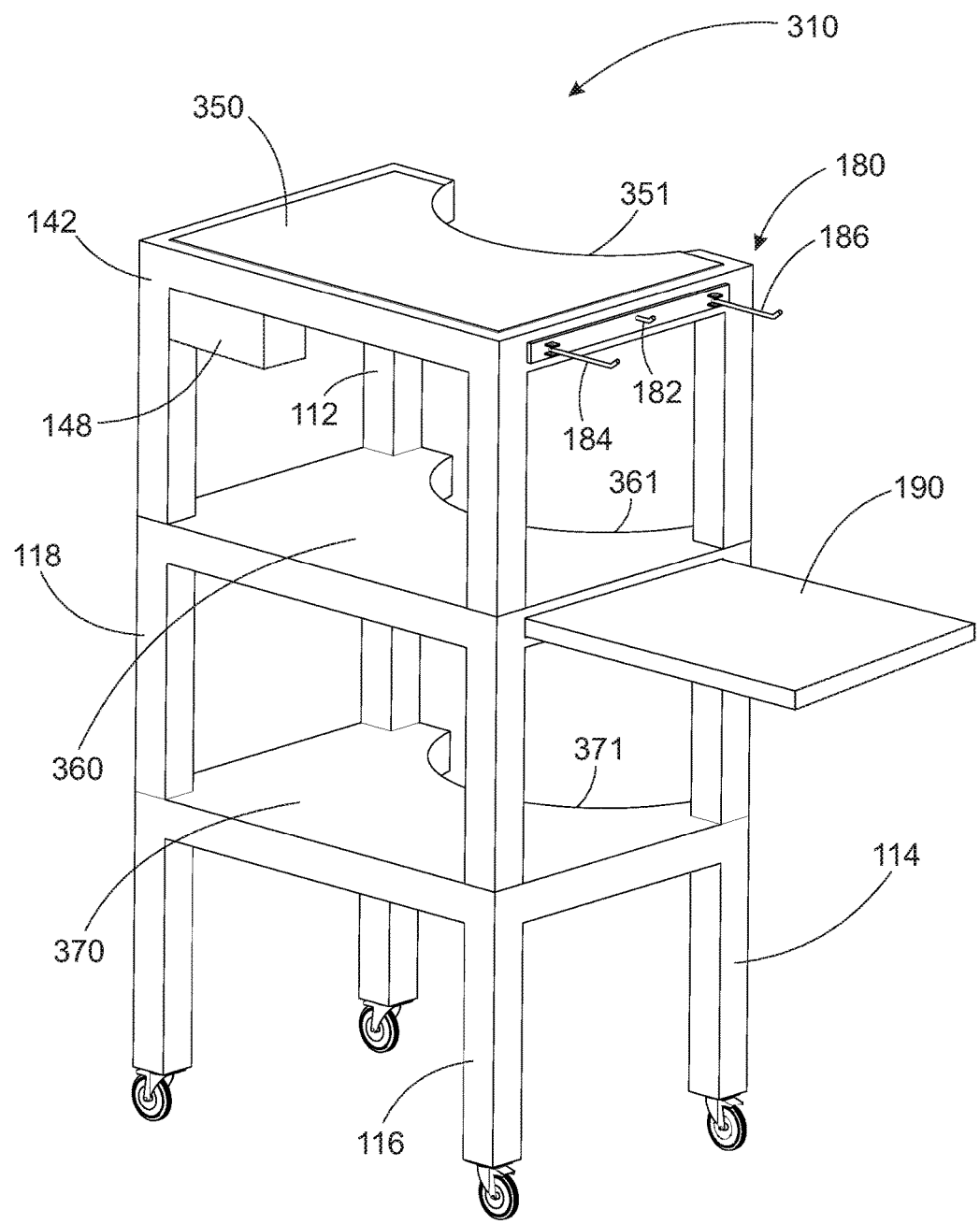
FIG. 5 shows a front perspective view of a further embodiment of a cart.

FIG. 5 shows an embodiment of a wheeled cart 310. Cart 310 is a mobile point-of-sale cart similar to cart 110, except that first platform 150 is replaced by first platform 350, second platform 160 is replaced with second platform 360, and third platform 170 is replaced with third platform 360. Each one of first, second, and third platforms 350, 360, and 370 have a semi-circular cutout in them to make it easy for an employee to stand at cart 310.

Mobile point-of sale cart 310 has three platforms 350, 360, and 370, which are similar to platforms 150, 160, and 170 of cart 110 as described above. Platforms 350, 360, and 370 are supported by legs 112, 114, 116, and 118, as described above for cart 110. Cart 310 has bagging station 180, and shopping bag support surface 190, as described above.

First platform 350 has a semi-circular cutout 351, as shown in FIG. 5. Second platform 360 has a semi-circular cutout 361, and third platform 370 has a semi-circular cutout 371. Cutouts 351, 361, and 371 are all on the same side of cart 310, so that a person standing alongside cart 310 can stand in cutouts 351, 361, and 371 to be closer to cart 310 and its equipment.

Cart 310 also has a power supply 148 coupled to the bottom of first platform 350. Power supply 148 provides power for a handheld scanner, debit card reader, and/or portable printer, as well as other equipment used with cart 310.

Figure 6:
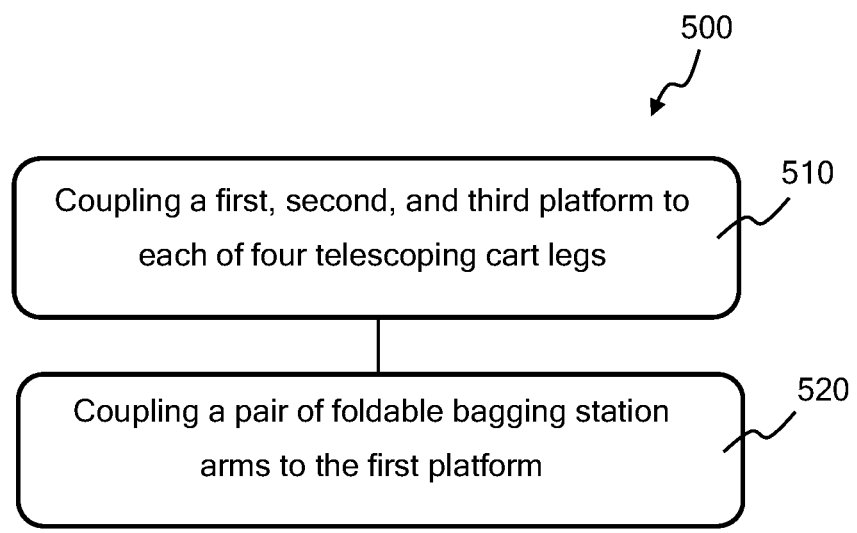
FIG. 6 illustrates a method of assembling a cart.

FIG. 6 illustrates a method 500 of assembling a cart. Method 500 includes an act 510 of coupling a first, second, and third platform to each of four telescoping cart legs. Method 500 also includes an act 520 of coupling a pair of foldable bagging station arms to the first platform. The resultant cart with a bagging station can be used by an employee of a retail store to checkout customers, bag products, or do other retail store tasks. In some embodiments, each of the first, second and third platforms has a semi-circular cutout. The semi-circular cutouts can make it easier for an employee to stand next to the cart and work. Method 500 can include many other acts. In some embodiments, method 500 includes coupling wheels to each of the four telescoping cart legs. In some embodiments, method 500 includes coupling an extendable shopping bag support surface to the second platform. The extendable shopping bag support surface can be used to support a bag that is hanging from the foldable bagging station arms and is being filled with items. In some embodiments, method 500 includes coupling a bag holder hook to the first platform, between the pair of foldable bagging station arms.

In some embodiments, method 500 includes forming a handheld scanner bin in a top surface of the first platform. In some embodiments, method 500 includes forming a debit card reader bin in the top surface. In some embodiments, method 500 includes forming a portable printer bin in the top surface. The bins are shaped to hold specific pieces of equipment so that the equipment is easy to find and does not fall off of the cart.

Described herein is a cart that can be used as a mobile point-of-sale cart in a retail store. The cart has three platforms supported by four telescoping legs that can be wheeled for easy mobility. The cart has an integrated bagging station and an integrated shopping bag support surface for ease in bagging purchases. The cart has multiple platforms for holding equipment often used by employees to checkout customers and perform other tasks. In some embodiments, the cart has bins formed in the top surface of a platform and designed to receive specific equipment such as a handheld scanner bin, a debit card reader bin, and/or a portable printer bin. In some embodiments, each of the three platforms has a semi-circular cutout so an employee can stand closer to the cart and the equipment held on the cart. The cart is lightweight and mobile and can be used throughout the retail store, providing checkout services at locations other than the fixed checkout registers, and providing a place for employees to store and carry equipment needed for performing tasks.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A wheeled cart having four corners comprising:
 a leg at each of the four corners, each leg having a wheel on a distal end, wherein each of the wheels rolls along a ground surface, and wherein each of the legs extends perpendicular to the ground surface;
 a first, second and third platform, wherein each of the platforms are supported by the legs, wherein each of the platforms has a cutout to provide closer standing access for an employee using the wheeled cart, wherein the first platform is above the second platform and the second platform is above the third platform, and wherein each of the platforms are oriented parallel to the ground surface;
 and
 a bagging station coupled to the first platform, wherein the bagging station comprises:
  a first handle holder arm foldably coupled to a side of the first platform, wherein the first handle holder arm has an extended position and a folded position;
  a second handle holder arm foldably coupled to the side of the first platform, wherein the second handle holder arm has an extended position and a folded position; and
  a bag holder hook coupled to the side of the first platform, wherein the bag holder hook is positioned between the first handle holder arm and the second handle holder arm, and wherein at least one shopping bag is hung from the bag holder hook using a center hole of the at least one shopping bag.

2. The wheeled cart of claim 1, further comprising a shopping bag support surface coupled to the second platform.

3. The wheeled cart of claim 2, wherein the shopping bag support surface is a rectangular shaped platform that retracts into the second platform, and wherein the shopping bag support surface is positioned between the bagging station and the ground surface when the shopping bag support surface is extended from the second platform.

4. The wheeled cart of claim 1, wherein the first and the second handle holder arm are both folded-against the first platform when the first and the second handle holder arm are in the folded position.

5. A cart having four legs, the cart comprising:
 a first, second and third platform, each of the platforms having a different height in relation to a ground surface, wherein each of the platforms is supported by the four legs, wherein each of the platforms has a cutout for providing closer standing access for an employee using the cart, and wherein the first platform is above the second platform and the second platform is above the third platform;
 a bagging station coupled to the first platform, wherein the bagging station comprises:
  a first handle holder arm foldably coupled to a side of the first platform adjacent a first leg of the four legs, wherein the first handle holder arm has an extended position and a folded position, and wherein the first handle holder arm is perpendicular to the first leg when the first handle holder arm is in the extended position;
  a second handle holder arm foldably coupled to the side of the first platform adjacent a second leg of the four legs, wherein the second handle holder arm has an extended position and a folded position, and wherein the second handle holder arm is perpendicular to the second leg when the second handle holder arm is in the extended position; and a bag holder hook coupled to the side of the first platform, wherein the bag holder hook is positioned between the first handle holder arm and the second handle holder arm, and wherein at least one shopping bag is hung from the bag holder hook using a center hole of the at least one shopping bag;

and a shopping bag support surface coupled to the second platform, wherein the shopping bag support surface is a rectangular shaped platform.

6. The cart of claim 5, wherein each of the four legs comprises a wheel.

7. The cart of claim 5 wherein the first and the second handle holder arm fold against the first platform.

8. The cart of claim 5, wherein the shopping bag support surface extends from and retracts into the second platform, and wherein the shopping bag support surface is positioned between the bagging station and a ground surface.

9. The wheeled cart of claim 3, wherein the first platform is a top platform.

10. The wheeled cart of claim 9, wherein the second platform is positioned parallel to the first platform and the third platform.

11. The wheeled cart of claim 1, wherein the first and the second handle holder arm are parallel to a top surface of the first platform.

12. The wheeled cart of claim 1, wherein the first handle holder arm extends from the side of the first platform in a direction perpendicular to each of the legs when the first handle holder arm is in an extended position.

13. The wheeled cart of claim 12, wherein the second handle holder arm extends from the side of the first platform in a direction perpendicular to each of the legs, when the second handle holder arm is in an extended position.

14. The cart of claim 5, wherein the first platform is a top platform.

15. The cart of claim 14, wherein the second platform is positioned parallel to the first platform and the third platform.

16. The wheeled cart of claim 1, wherein the cutout is semi-circular.

17. The cart of claim 5, wherein the cutout is semi-circular.

* * * * *